United States Patent Office 3,506,982
Patented Apr. 21, 1970

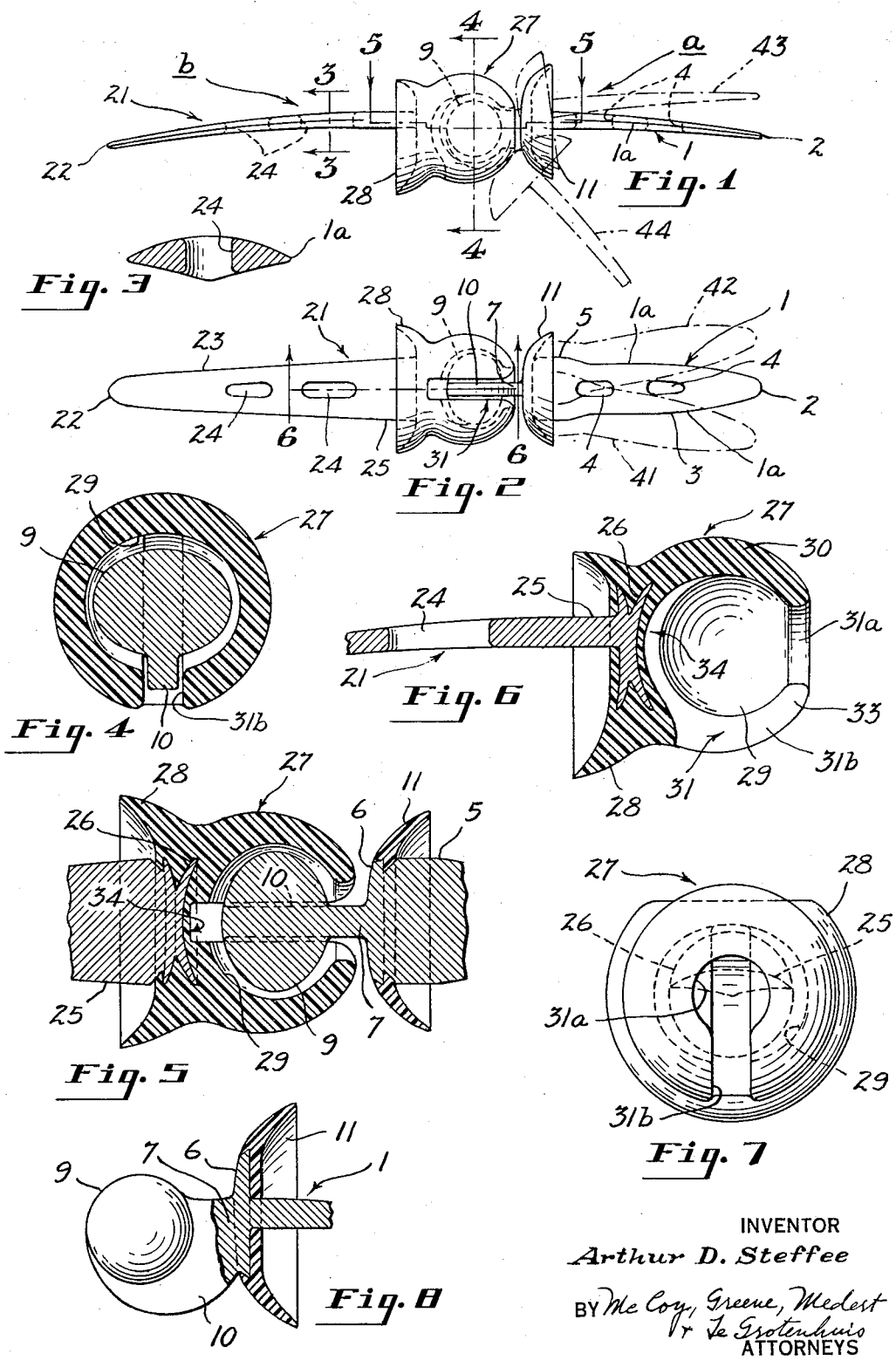

3,506,982
ENDOPROSTHETIC JOINTS
Arthur D. Steffee, Gates Mills, Ohio (% Cleveland Clinic, 2020 E. 93rd St., Cleveland, Ohio 44106)
Filed June 21, 1965, Ser. No. 465,358
Int. Cl. A61f 1/00
U.S. Cl. 3—1
20 Claims

ABSTRACT OF THE DISCLOSURE

Endoprosthetic joints for natural ginglymus joints including phalangeal joints and the metacarpophalangeal joint, employing ball and socket articulation, the socket being of yieldable material and having flexible lip portions, the ball removably retained in the socket by such lips, the ball and socket each provided with a stem for insertion into intermedullary bone canals, the inner surface of the socket having a slot, a key mounted on the ball for slidable reception in the slot, guards mounted on such stems to mitigate against migration of the prosthesis into the supporting bone, the socket opening shaped to determine the limits of flexion, extension, hyperextension, adduction and abduction which the prosthesis shall be capable of approximating in usage.

---

This invention relates to endoprosthetic joints and more particularly to an endoprosthesis for ginglymus joints which will be durable and capable of withstanding strenuous usage; which may be solidly implanted in the body of a subject human or animal and resist displacement, twisting or migration into the surrounding bone; which will closely approximate the motion of a healthy natural joint; and which will be relatively easy to insert and thereafter cause a minimum of pain, discomfort or restriction of activity in the subject.

Heretofore, prosthetic joints have been used to replace defective natural joints in humans and animals, but such prostheses have often been found impractical. Prior prosthetic joints often became inoperative and painful to the subject in even moderate usage. Hinge-type endoprostheses are in common usage today for ginglymus joints. These prostheses generally are installed in the subject in two parts and then joined in the operating room with a screw, bolt, pin, etc., which requires additional specially designed tools. Even greater difficulties, however, have arisen from the tendency of the connecting bolt or pin to break or to work loose at some later date under even moderate activity of the subject. For this reason, subsequent operations have been required to repair the prosthesis. Very often, substantial damage has been done to the surrounding bone, tendons or ligaments which is difficult or impossible to repair.

The connection of prior prosthetic joints to supporting bone has given rise to further problems. Arthritic bone is very soft, whereas the bones of other subjects may be quite brittle. Consequently, what may prove a satisfactory connecting device for a prosthesis in one subject may be inadequate for other subjects. In the past, endoprosthetic joints have been provided with stems which are inserted into the intermedullary canal of the supporting bones. These stems will frequently twist out of position under strain, especially in soft arthritic bone, with a resulting misalignment of the associated limbs. It has also been a common disadvantage of earlier prostheses to have the stem migrate further into the intermedullary canal, causing the bone to split. In such cases, the prosthesis moves out of proper position, and the split bone often comes to interfere with the moving parts of the joint. Extreme and painful cases of migration have occurred and restoration of normal function to the joint is difficult or even impossible.

Endoprosthetic joints prior to the present invention, notably the hinge-type joints hereinbefore mentioned, have often failed to duplicate the motion permitted by healthy natural joints. Such limited movement often makes the subject's motions awkward and have proven inconvenient, embarrassing and even dangerous to him. In particular, no prior joint has permitted satisfactory adduction and abduction in the associated limb, such motion being highly important in the first joint of the thumb and fingers of human subjects.

The present invention overcomes the disadvantages mentioned above and provides a prosthetic joint which is durable and can withstand certain strains or blows that would damage natural joints. As in earlier devices, the prosthesis of the present invention is inserted into the supporting bone in two separate elements, thus minimizing the length of the incision and the amount of bone to be removed, and to make insertion faster and easier. Once the stems are properly impacted, the elements are joined in operable relation. Unlike earlier devices, the present invention contemplates a ball and socket connection, wherein the socket is provided with flexible lip portions which tend to hold the ball in the socket cavity but which permit the ball to be manually flexed in and out of the socket. Thus, the surgeon may quickly and easily connect the elements by hand, obviating the need for specially designed connecting instruments heretofore required and eliminating any pins, screws or rivets which could work loose later. If the present prosthetic joint should become dislocated in the subject's hand, it can be manually relocated without further surgery.

In addition, the present invention provides a prosthetic joint which may be securely anchored in the supporting bone whereby undesirable twisting and migration hereinbefore noted are eliminated. The articulating portions of the prosthesis are provided with stems for insertion into the intermedullary canals of the supporting bones. Each stem is relatively wide and flat and will not easily twist in a suitably reamed bone canal. Furthermore, the stems are provided with fenestrations or apertures into which pieces of healthy bone are packed. In time, the bone segments graft themselves to the walls of the intermedullary canal and anchor the stems therein to mitigate against displacement of the prosthesis. A cup-shaped guard is mounted on each stem adjacent the respective ball and socket portions and abuts the end of the supporting bone, thus providing a stop-guard to assure that the stem will not migrate further into the bone at some later date. The guards are of a plastic material which is easily trimmed by the surgeon to fit the adjacent bone.

Unlike prior prostheses, the present invention contemplates a prosthetic joint which permits an accurate approximation of the motions possible with healthy natural joints. Prostheses for ginglymus joints typically have been of hinge-type construction which allow the associated limb to move only in a single plane. The present invention provides a ball and socket joint which generally limits motion to a single plane (i.e., flexion and extension) but which is capable of allowing motion outside that plane at a given position or positions (i.e., adduction and abduction). Several natural ginglymus joints in the human body, notably the first joints of the thumbs, fingers, and toes, are capable of adduction and abduction, and the present invention now provides a prosthetic joint to accurately duplicate these movements.

It is among the objects of the present invention to provide a prosthetic joint which will be sturdy, durable and resist damage thereto in normal usage and which will be stronger than a natural joint in certain respects.

Another object of the present invention is to provide a prosthetic joint which may be firmly seated in the supporting bone and successfully resist forces tending to twist or dislodge it from its seat.

A further object of the present invention is to provide a prosthetic joint which, when inserted, permits the subject to duplicate the movements of which a person having healthy natural joints is capable.

Still another object of the present invention is to provide a prosthetic joint which may be inserted into the subject in two parts, and then be quickly and easily joined by hand, thus requiring a relatively small incision, shortening the length of time which the subject spends in surgery, requiring the surgeon to remove less bone whereby the prosthesis may be more securely seated, and obviating the need for special connecting instruments heretofore required.

A still further object of the present invention is to provide a prosthesis for ginglymus joints having no screws, rivets, pins, etc., to work loose at a later time.

Yet another object of the present invention is to provide a prosthetic joint which, if dislocated while in the subject, can be relocated without surgery.

These and other objects and advantageous features, not at this time more particularly pointed out, will become more apparent as the nature of the invention is better understood from the following detailed description of one preferred embodiment thereof taken in conjunction with the accompanying drawings, wherein like reference characters denote corresponding parts, and wherein:

FIGURE 1 is a side elevational view of a prosthetic joint constructed in accordance with the present invention, shown in its extended position, with its hyper-extended and flexed position shown in phantom;

FIGURE 2 is a plan view of the prosthetic joint shown in FIGURE 1 in its extended position with its adducted and abducted positions shown in phantom;

FIGURE 3 is an enlarged transverse sectional view taken substantially on the line 3—3 of FIGURE 1;

FIGURE 4 is an enlarged transverse sectional view taken substantially on the line 4—4 of FIGURE 1;

FIGURE 5 is an enlarged fragmentary longitudinal sectional view of the prosthesis taken along lines 5—5 of FIGURE 1;

FIGURE 6 is an enlarged longitudinal fragmentary sectional view of the socketed member of the prosthesis taken along line 6—6 of FIGURE 2 with parts omitted;

FIGURE 7 is an enlarged fragmentary transverse view of the socketed member of the prosthesis; and FIGURE 8 is an enlarged fragmentary longitudinal elevational view of the protuberant headed member of the prosthesis with parts broken away and shown in section.

With reference to FIGURES 1 and 2 of the drawings, there is shown an endoprosthetic joint for replacement of the metacarpophalangeal joint in a human hand which is but one example of a prosthetic device constructed in accordance with the teachings of the present invention, and comprising a protuberant headed member $a$ and a socketed member $b$ joined in operable relation.

Protuberant headed member $a$ includes a thin stem portion 1 having a narrow blunt end portion 2, a partially tapered medial portion 3 provided with two apertures 4 on the longitudinal axis thereof, and a relatively wide end portion 5 carrying a disc-shaped anchor portion 6 extending radially outward from the longitudinal axis of stem portion 1, shown best in FIGURES 5 and 8. Stem portion 1 is slightly curved about its wide surface and has thin edge surfaces 1$a$. Narrow neck portion 7 extends longitudinally from anchor portion 6 and carries a protuberant head portion 9 which is a prolate spheroid and is mounted with its major axis perpendicular to neck 7. A thin, semi-crescent-shaped key portion 10 extends from neck portion 7 and anchor portion 6 about one-half the minor circumference of spheroidal portion 9 to a point of diminishment thereon, as best shown in FIGURE 8. Member $a$ is preferably of a chromium cobalt alloy sold under the registered U.S. trademark "Vitallium" alloy which is durable and inert to acids found in the human body.

Cup-shaped plastic guard member 11 is molded on anchor portion 6 and extends radially outward from the longitudinal axis of stem 1. Guard member 11 is preferably of a tetrafluoroethylene sold under the registered U.S. trademark "TFE–1B Teflon" which is durable and inert to body acids.

Socketed stem member $b$ includes a thin stem portion 21 which is slightly curved about its wide surface and has a narrow blunt end portion 22, a tapered medial portion 23 provided with two apertures 24 on the longitudinal axis thereof, and a relatively wide end portion 25 carrying a circular flanged anchor portion 26 which extends radially outward from the curved longitudinal axis of stem 21. Socket member 27 is preferably of Teflon or other flexible material whereupon it may be molded on flanged anchor portion 26 and includes a cup-shaped guard portion 28 extending radially outward from the longitudinal axis of stem 21. Socket member 27 is provided with a generally spherical cavity 29 defined by wall portion 30. As shown in FIGURES 6 and 7, wall portion 30 is provided with an aperture 31 which is defined by flexible lip portions 33 of wall 30. Aperture 31 has a generally circular portion 31$a$ positioned substantially opposite the anchor portion 26 of member $b$ and an elongated portion 31$b$ which is narrow relative to the diameter of portion 31$a$ and which extends approximately 90° about the circumference of socket 27. The inner surface of wall 30 is provided with a semi-crescent-shaped slot 34 which extends circumferentially about the inner surface of wall 30 from the narrow end of elongated aperture 31, substantially coplanar therewith, to a point of diminishment adjacent circular aperture 31.

Insertion of the metacarpophalangeal joint prosthesis of the present invention requires preliminary resection of the metacarpal head and phalangeal base, whereupon the intermedullary canals of those bones are then suitably reamed to receive stems 1 and 21. Apertures 4 and 24 of stems 1 and 21 are packed with segments of healthy bone tissue. Stem portion 1 of member $a$ and the stem portion 21 of socketed member $b$ are then driven up to their cupped guard portions 11 and 28 into the intermedullary canals of the phalangeal and metacarpal bones, respectively. The plastic guards may then be trimmed with a scalpel or other instrument in order that they will seat securely and coincide with the diameter of the adjacent bone. Spheroidal ball portion 9 of member $a$ is then forced past flexible lip portion 33 of socketed member $b$ into the cavity 29 to join members $a$ and $b$ in operable relation, whereupon standard surgical techniques are pursued to complete the operation. In time, the bone tissue in apertures 4 and 24 of stems 1 and 21 will graft to the surrounding intermedullary walls to secure the prosthesis against twisting or becoming dislodged.

When the subject's finger is extended, neck portion 7 of member $a$ protrudes through the circular portion 31$a$ of aperture 31 in socket 27, and key portion 10 of member $a$ rests in the elongated portion 31$b$. Circular portion 31$a$ of aperture 31 is slightly wider than the neck 7 (shown in FIGURE 7) whereby the neck 7 may move from side to side therein and permit the joint to approximate the natural side-to-side movement of an extended human finger known as adduction and abduction (shown in phantom in FIGURE 2 at 41 and 42, respectively). Circular portion 31$a$ of aperture 31 is large enough to permit a natural degree of hyper-extension in the subject joint, shown in phantom at 43 in FIGURE 1. When the subject flexes his finger, as at 44 of FIGURE 1, neck portion 7 of member $a$ tracks in elongated portion 31$b$ of aperture 31, and key portion 10 of member $a$ slides in slot 34 of socket 27. Narrow portion 31$b$ of aperture 31 and the slot 34 are more closely fitted to neck 7 and key 10, whereby adduction and abduction are now substantially eliminated, thus causing the motion of the prothesis to further conform to the characteristics of a natural metacarpophalangeal joint. When neck 7 reaches the end of aperture 31, further flexion is impossible, and thus the degree of flexion attainable with the given prosthesis is limited by the relative dimensions of the aperture 31, neck 7, key 10, slot 34, head 9 and cavity 29. In the metacarpophalangeal joint prosthesis under instant discussion, aperture 31 has a length (as shown in FIGURE 6) which will limit flexion to approximately 90° in conformity with the characteristics of a natural joint.

Key 10 serves to substantially eliminate rotation of member a about the longitudinal axis of stem portion 1 relative to socketed member b and to provide stability to the prosthesis. In a modification of the present invention (not shown), a neck portion 7 could be extended downwardly in a direction normal to its longitudinal axis, and key 10 could be eliminated, thus providing further means to mitigate against the undesirable rotation of member a about its longitudinal axis, though reducing the stability of the prosthesis as a whole.

In a modification of the present invention (not shown), the wide portion 31a of aperture 31 is narrowed to the dimensions of portion 31b. Thus, the adduction-abduction feature of the prosthesis is substantially eliminated, and the prosthesis is suitable for ginglymus joints such as the proximal-interphalangeal finger joint which does not adduct or abduct. For these joints, a more cylindrical protuberant head portion 9 and cavity 29 will be employed. A larger version of such a prosthesis is suitable for knee and elbow joints.

Further stability, in addition to that provided by the grafted bone in apertures 4 and 24, is lent to the prosthesis by the slight longitudinal curvature of the stems 1 and 21, which causes them to wedge in the canal, and also by the thin blade-like cross section of the stems which when the intermedullary canals are suitably reamed, assists in preventing the stems from twisting in the canals under strain. In addition, the plastic guard portions 11 and 28 prevent the stems from migrating further into the intermedullary bone canals.

Insertion of the spheroidal head portion 9 of member a into cavity 29 in socket 27 of member b is facilitated by the prolate shape of head 9. The portion of head 9 having the shortest radius of curvature (i.e., at one end of its major axis) is easily forced between lip portions 33 of socket 27; whereas a spherical head member, for example, having transverse dimensions similar to the ball member 9, shown in the drawings, would have a greater radius of curvature and be more difficult to force between the flexible, though necessarily stiff, lip portions 33 of member b.

Having thus described my invention, I claim:

1. An implantable type endoprosthesis for ginglymus joints made of materials which are substantially inert when implanted in the body comprising,
   (a) a protuberant headed member comprising,
      (1) a stem portion for affixing said member in bone,
      (2) a neck portion on one end of said stem, and
      (3) a proturberant head portion on said neck portion; and
   (b) a socketed member comprising,
      (1) a stem portion for affixing said member in bone, and
      (2) a polymeric socket portion on one end of said stem and having wall portions defining the socket cavity with lip portions defining an elongated aperture communicating with said cavity, at least one of said lip portions being flexible, said protuberant head portion of said protuberant headed member removably retained in said socket cavity by said lips for cooperating angular motion, said neck portion locating in said elongated aperture, said elongated aperture being narrower than said protuberant head portion and approximately as wide as said neck portion over the greater portion of the length of said aperture so that the motion of said neck portion in said aperture is substantially limited to a single plane and said endoprosthesis approximates the motion of a natural ginglymus joint.

2. A ginglymus joint endoprosthesis as recited in claim 1 wherein the inner surface of said socket portion is provided with a slot, and wherein a key is disposed upon said head portion and slidably located in said slot.

3. A ginglymus joint endoprosthesis as recited in claim 1 wherein a transverse guard is disposed upon the stem of each of said socketed and protuberant headed members adjacent said socket and neck portions, respectively.

4. A ginglymus joint endoprosthesis as recited in claim 3 wherein said transverse guards are of a polymeric material.

5. A ginglymus joint endoprosthesis as recited in claim 1 wherein said head portion is a prolate spheroid with its major axis parallel to the axis about which said head portion rotates to approximate flexion and extension in a natural ginglymus joint.

6. An endoprosthesis for ginglymus joints as recited in claim 1 wherein each stem comprises a thin tapered member having a wide surface and being curved along its longitudinal axis about its wide surface and having a transverse aperture therein.

7. A ginglymus joint endoprosthesis as recited in claim 2 wherein a transverse guard is disposed upon the stem of each of said socketed and protuberant headed members adjacent said socket and neck portions, respectively.

8. A ginglymus joint endoprosthesis as recited in claim 7 wherein said transverse guards are of a yieldable polymeric material.

9. A ginglymus joint endoprosthesis as recited in claim 8 wherein said head portion is a prolate spheroid with its major axis parallel to the axis about which said head portion rotates to approximate flexion and extension in a natural ginglymus joint.

10. An endoprosthesis for ginglymus joints as recited in claim 9 wherein each stem comprises a thin tapered member, said member being curved along its longitudinal axis about it wide surface and having a transverse aperture therein.

11. An endoprosthesis for ginglymus joints as recited in claim 1 wherein said elongated aperture has an enlarged portion at one end so that while the motion of said neck portion over the greater portion of the length of said aperture is substantially limited to a single plane, said neck portion can be moved out of said plane when locating in said enlarged portion of said aperture and said endoprosthesis approximates the motion of a natural metacarpophalangeal ginglymus joint having a limited degree of adduction and abduction in its extended position.

12. A ginglymus joint endoprosthesis as recited in claim 11 wherein the inner surface of said socket portion is provided with a slot, and wherein a key is disposed upon said head portion and slidably located in said slot.

13. A ginglymus joint endoprosthesis as recited in claim 11 wherein a transverse guard is disposed upon the stem of each of said socketed and protuberant headed members adjacent said socket and neck portions, respectively.

14. A ginglymus joint endoprosthesis as recited in claim 13 wherein said transverse guards are of a polymeric material.

15. An endoprosthesis for ginglymus joints as recited in claim 11 wherein said protuberant head is essentially a prolate spheroid with its major axis perpendicular to said neck portion.

16. An endoprosthesis for ginglymus joints as recited in claim 11 wherein each stem comprises a thin tapered member having a wide surface and curved along its longitudinal axis about its wide surface and having a transverse aperture therein.

17. An endoprosthesis for ginglymus joints as recited in claim 12 wherein a transverse guard is mounted on each of said stems adjacent said socket and said neck respectively.

18. A ginglymus joint endoprosthesis as recited in claim 17 wherein said transverse guards are of a polymeric material.

19. A ginglymus joint endoprosthesis as recited in claim 18 wherein said head portion is a prolate spheroid with its major axis parallel to the axis about which said head portion rotates to approximate flexion and extension in a natural ginglymus joint.

20. An endoprosthesis for ginglymus joints as recited in claim 19 wherein each stem comprises a thin tapered member having a wide surface and curved along its longitudinal axis about its wide surface and having a transverse aperture therein.

References Cited

UNITED STATES PATENTS

| 2,422,302 | 6/1947 | Horn. |
|---|---|---|
| 2,947,308 | 8/1960 | Gorman. |
| 3,064,645 | 11/1962 | Fical et al. |
| 3,228,393 | 1/1966 | Michele. |
| 2,910,978 | 11/1959 | Urist. |

FOREIGN PATENTS

| 1,047,640 | 7/1953 | France. |
|---|---|---|
| 1,122,634 | 5/1956 | France. |

OTHER REFERENCES

Journal of Bone and Joint Surgery for October 1956, advertising page 41.

"Use of a Hinged Vitallium Prosthesis for Arthroplasty of the Knee" by H. Young, Journal of Bone and Joint Surgery, vol. 45–A, No. 8, December 1963, pp. 1627–1642.

Journal of Bone and Joint Surgery for October 1964, vol. 46–A, No. 7, advertising page 29.

"Replacement of Arthritic Hips by the McKee-Farrar Prosthesis" by G. K. McKee et al., Journal of Bone and Joint Surgery, vol. 48B, No. 2, May 1966, pp. 245–259 (only pp. 245–246 relied upon).

RICHARD A. GAUDET, Primary Examiner

R. L. FRINKS, Assistant Examiner

U.S. Cl. X.R.

128—92